(12) United States Patent
Peng et al.

(10) Patent No.: US 8,462,374 B2
(45) Date of Patent: Jun. 11, 2013

(54) PRINTER CONTROL METHOD, AN APPARATUS AND A PRINTER USING THE METHOD

(75) Inventors: Yuanbin Peng, Weihai (CN); Jiabo Xu, Weihai (CN); Lei Che, Weihai (CN); Zhuanlong Yu, Weihai (CN); Tao Zhang, Weihai Shandong Province (CN)

(73) Assignee: Shandong New Beiyang Information Technology Co., Ltd., Weihai, Shandong Province (CN)

(*) Notice: Subject to any disclaimer, the term of this patent is extended or adjusted under 35 U.S.C. 154(b) by 912 days.

(21) Appl. No.: 12/525,662

(22) PCT Filed: Jan. 31, 2008

(86) PCT No.: PCT/CN2008/070222
§ 371 (c)(1),
(2), (4) Date: Aug. 3, 2009

(87) PCT Pub. No.: WO2008/095443
PCT Pub. Date: Aug. 14, 2008

(65) Prior Publication Data
US 2010/0053672 A1    Mar. 4, 2010

(51) Int. Cl.
*G06K 15/00* (2006.01)
*G06F 3/12* (2006.01)

(52) U.S. Cl.
USPC .......................................... 358/1.15; 358/1.14

(58) Field of Classification Search
USPC .............. 358/1.3, 1.9, 1.6, 1.15, 1.14; 307/38
See application file for complete search history.

(56) References Cited

U.S. PATENT DOCUMENTS

| | | |
|---|---|---|
| 5,258,748 A | 11/1993 | Jones |
| 6,065,884 A | 5/2000 | Parker et al. |
| 6,173,320 B1 | 1/2001 | Cunningham |
| 6,832,320 B1 | 12/2004 | Broyles, III et al. |
| 6,873,333 B1 | 3/2005 | Patel et al. |

(Continued)

FOREIGN PATENT DOCUMENTS

| | | |
|---|---|---|
| CN | 2581173 Y | 10/2003 |
| CN | 1138200 | 2/2004 |

(Continued)

OTHER PUBLICATIONS

Office Action, Korean Intellectual Property Office, dated Jul. 29, 2011, 7 pages.

(Continued)

*Primary Examiner* — Jerome Grant, II
(74) *Attorney, Agent, or Firm* — Kilpatrick & Townsend Stockton LLP

(57) ABSTRACT

A printer control method includes the following steps: setting triggering conditions for executing functional items and for startup a configuration menu; executing a functional item if the key information had fulfilled the triggering condition for executing the functional item; and launching a configuration menu if the key information had fulfilled the triggering conditions for startup the configuration menu. By setting the triggering conditions for executing functional items and for startup a configuration menu, then determining whether the key information has fulfilled the triggering conditions for executing functional items and for startup a configuration menu, the printer directly executes the functional item as long as the key information has fulfilled the triggering condition for executing the functional item. When the printer is powered on, it skips the step of launching the configuration menu, operates conveniently and saves paper.

9 Claims, 7 Drawing Sheets

U.S. PATENT DOCUMENTS

| | | |
|---|---|---|
| 2002/0122079 A1 | 9/2002 | Kamen et al. |
| 2004/0263377 A1 | 12/2004 | Risi |
| 2005/0144432 A1 | 6/2005 | Wu |
| 2005/0185096 A1 | 8/2005 | Hsieh |
| 2005/0283340 A1 | 12/2005 | Mathur |
| 2010/0181835 A1* | 7/2010 | Ulmer .............................. 307/38 |

FOREIGN PATENT DOCUMENTS

| | | |
|---|---|---|
| CN | 1661662 | 8/2005 |
| JP | 2-151128 | 6/1990 |
| JP | 6348085 A | 12/1994 |
| JP | 7117317 A | 5/1995 |
| JP | 2004066698 A | 3/2004 |
| TW | 200407758 | 5/2004 |

OTHER PUBLICATIONS

European Search Report of 08705699.1 mailed on Nov. 12, 2012, 11 pages.

* cited by examiner

```
                    Menu
Items              The number of key-presses
Esc                                        1
Print self test information                2
Configure the printer                      3
Printer test 1                             4
Printer test 2                             5
```

First part of self test information
Version of the printer
  hardware version   V1.00
  software version   V2.00
Interfacing mode: Serial
  baud rate: 9600bps
  data bit: 8bits
  parity bit: null
  stop bit: 1bits
  handshake: DTR/DSR
Data buffer
  4K bytes
Print speed
  100mm/s
Print density
  Common

Figure 7

Second part of self test information
!"#$%&'()*+,-./0123456789
"#$%&'()*+,-./0123456789 A
$%&'()*+,-./0123456789 AB
$%&'()*+,-./0123456789 ABC
%&'()*+,-./0123456789 ABCD
&'()*+,-./0123456789 ABCDE
'()*+,-./0123456789 ABCDEF
()*+,-./0123456789 ABCDEFG
)*+,-./0123456789 ABCDEFGH
*+,-./0123456789 ABCDEFGHI
+,-./0123456789 ABCDEFGHIJ
,-./0123456789 ABCDEFGHIJK
-./0123456789 ABCDEFGHIJKL
./0123456789 ABCDEFGHIJKLM
/0123456789 ABCDEFGHIJKLMN
0123456789 ABCDEFGHIJKLMNO

PRINTER CONTROL METHOD, AN APPARATUS AND A PRINTER USING THE METHOD The present application claims priority to Chinese Patent Application No. 200710003492.X, entitled "PRINTER CONTROL METHOD AND DEVICE, AND A PRINTER", filed with Chinese Patent Office on Feb. 5, 2007, which is incorporated herein in its entirety.

FIELD OF THE INVENTION

The present invention relates to the technical field of print control, and particularly to a printer control method and device and a printer including the control device.

BACKGROUND OF THE INVENTION

At present, receipt printers such as a Point of Sales (POS) printer have been widely used in many fields such as retail, foodservice and medical service. At the same time, more and more users require the printer to provide local configuration functions, i.e. the functions that the users change a certain character locally. Typically, the configuration is a communication interface configuration, e.g. a serial interface baud rate configuration, which is particularly adapted to configure a printer with functions or parameters under the condition that the printer can not be connected with a microcomputer or does not need to be connected with a microcomputer.

A printer with multiple keys or a display module such as a liquid crystal display can implement the configuration functions conveniently and flexibly. However, for reducing the cost, most receipt printers especially the POS printer is provided with a single key without any display module such as a liquid crystal display.

The following method is adopted to implement function configuration of a printer via a single key. As illustrated in FIG. 1, the method includes the steps: pressing a key to power on and printing a printer configuration main menu; and pressing the key to select a sub-menu to perform function parameter configuration of the printer according to a prompt of the configuration main menu. In this way, the function configuration of the printer is implemented. Information of the configuration main menu is illustrated in FIG. 2.

With the method, the function configuration of the printer is implemented via a single key. However, for users that do not need to perform the printer configuration but desire to perform a certain function item such as print self test information, the configuration menu should be printed firstly, and the function item is performed according to the prompt of the configuration menu. Therefore, the operating process is complex and paper-wasting.

SUMMARY OF THE INVENTION

In view of this, an object of embodiments of the present invention is to provide a simple and paper-saving printer control method and device, and a printer.

A printer control method includes:
setting a function item execution triggering condition and a configuration menu initiation triggering condition; and
executing a function item if key-press information meets the function item execution triggering condition; and initiating a configuration menu if key-press information meets the configuration menu initiation triggering condition.

Preferably, the function item execution triggering condition comprises: the state of the printer converts from power-off to power-on.

Preferably, the function item execution triggering condition or the configuration menu initiation triggering condition comprises: if a printer is in a power-on state, the number of key-presses within a preset period of time is more than or equal to a preset number of key-presses.

Preferably, the function item execution triggering condition or the configuration menu initiation triggering condition comprises: if a printer is in a power-on state, a key-press duration is more than a preset time threshold.

Preferably, the key-press information is: the number of key-presses within a preset period of time, a key-press duration, or power-on indication information for indicating a conversion from a power-off state to a power-on state of the printer.

Preferably, the function item is "Print self test information" or "Configure the printer".

Preferably, if the function item is "Print the first part of self test information", the execution triggering condition is: the state of the printer converts from power-off to power-on; if the function item is "Print the second part of self test information", the execution triggering condition is: the key-press information is that a key-press duration is equal to a preset time threshold; the configuration menu initiation triggering condition is: the key-press information is that a key-press duration is not equal to a preset time threshold.

The present invention further provides a printer control device, comprising: a condition information reference unit, a key-press information obtaining unit, a determination unit, an execution unit and a configuration menu initiation unit; where the condition information reference unit is adapted to store condition reference information which is set by a user, the condition reference information including a function item execution triggering condition and a configuration menu initiation triggering condition;

the key-press information obtaining unit is adapted to obtain key-press information and deliver the key-press information to the determination unit;

the determination unit is adapted to compare the key-press information and the condition reference information, and determine whether the key-press information meets a triggering condition according to a comparison result, sends an execution instruction message for executing a function item if the key-press information meets the function item execution triggering condition; and sends an initiation instruction message for initiating a configuration menu if the key-press information meets the configuration menu initiation triggering condition;

the execution unit is adapted to execute the function item on receiving the execution instruction message; and the configuration menu initiation unit is adapted to initiate the configuration menu on receiving the initiation instruction message.

Preferably, the key-press information is: the number of key-presses within a preset period of time, a key-press duration, or power-on indication information for indicating a conversion from a power-off state to a power-on state of a printer.

The present invention further provides a printer, comprising an input key and a print component adapted to print information, wherein the printer further comprises a control device which includes: a condition information reference unit, a key-press information obtaining unit, a determination unit, an execution unit and a configuration menu initiation unit; where the condition information reference unit is adapted to store condition reference information which is set by a user, the condition reference information comprising a function item execution triggering condition and a configuration menu initiation triggering condition;

the key-press information obtaining unit is connected with the input key and adapted to obtain key-press information and deliver the key-press information to the determination unit;

the determination unit is adapted to compare the key-press information and the condition reference information, and determine whether the key-press information meets a triggering condition according to a comparison result, sends an execution instruction message for executing a function item if the key-press information meets the function item execution triggering condition, and sends an initiation instruction message for initiating a configuration menu if the key-press information meets the configuration menu initiation triggering condition; and the execution unit is adapted to send the function item to the print component on receiving the execution instruction message, and the configuration menu initiation unit is adapted to initiate the configuration menu on receiving the initiation instruction message.

Preferably, the key-press information is: the number of key-presses within a preset period of time, a key-press duration, or power-on indication information for indicating a conversion from a power-off state to a power-on state of a printer.

It can be known from the above technical solution, compared with the prior art, in the embodiments of the present invention, commonly used function item execution triggering conditions and a configuration menu initiation triggering condition are set, through which it is determined whether the key-press information meets the function item execution triggering conditions or the configuration menu initiation triggering condition. If the key-press information meets a function item execution triggering condition, a function item is executed directly, which can reduce direct initiation of the configuration menu and bring simple operations. For those users who do not need to menu match but desire to directly execute a particular function item, it does not need to print a configuration menu, thereby saving papers.

BRIEF DESCRIPTION OF THE DRAWINGS

FIG. 7 is a schematic diagram of a first part of self test information;

DETAILED DESCRIPTION OF THE INVENTION

The printer mentioned in the context refers to a receipt printer such as a POS printer, particularly to a printer with a single key.

The basic idea of embodiments of the present invention is that: a function item execution triggering condition and a configuration menu initiation triggering condition are set; a function item is executed if key information meets the function item execution triggering condition; and a configuration menu is initiated if key information meets the configuration menu initiation triggering condition.

The present invention is described in further detail with reference to the drawings and embodiments in order to make those skilled in the art better understand the technical solution of the present invention.

Figures 1, 2:
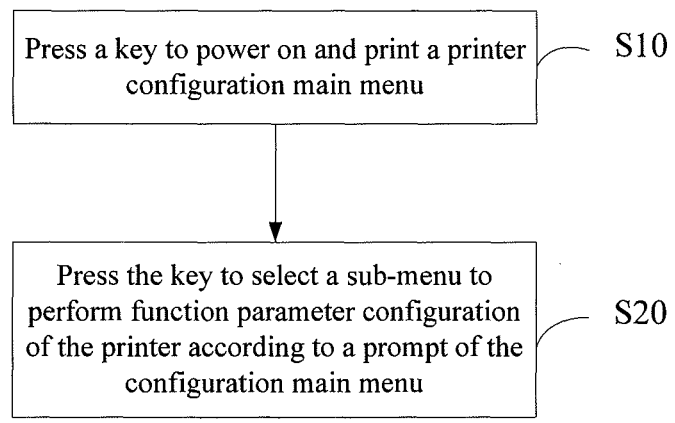
FIG. 1 is an implementing flowchart of the prior art.
FIG. 2 is a schematic diagram of a configuration menu of the prior art.
Figure 3:
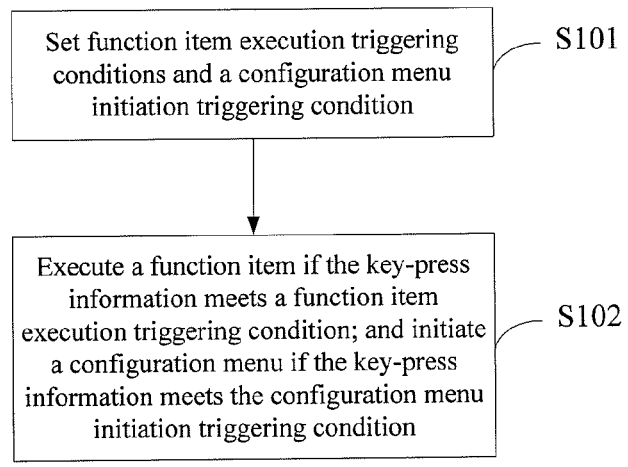
FIG. 3 is an implementing flowchart of a printer control method according to the present invention.

FIG. 3 is an implementing flowchart of a printer control method according to the present invention.

The printer control method includes the steps as follows.

In step S101, function item execution triggering conditions and a configuration menu initiation triggering condition are set.

A configuration menu includes multiple function items and methods for executing the function items. Execution triggering conditions of commonly used function items such as "Print self test information" and "Print test page" are set in the configuration menu. Also, a configuration menu initiation triggering condition is set, so that the users can select to directly perform the function items or to initiate the configuration menu.

The function item execution triggering conditions and the configuration menu initiation triggering condition may be set according to key-press information. The key-press information may be: the number of key-presses within a preset period of time, or a key-press duration. The function item execution triggering conditions and the configuration menu initiation triggering condition may be: the number of key-presses within the preset period of time is equal to a preset number of key-presses, or the key-press duration is more than a preset time threshold.

In step S102, a function item is executed if the key-press information meets a function item execution triggering condition; and the configuration menu is initiated if the key-press information meets the configuration menu initiation triggering condition.

If the key-press information meets the function item execution triggering condition or the configuration menu initiation triggering condition, the key-press information may be: the number of key-presses within the preset period of time, the key-press duration, or power-on indication information for indicating a conversion from a power-off state to a power-on state of the printer.

If the number of key-presses within the preset period of time is equal to the preset number of key-presses, or the key-press duration is more than the preset time threshold, or the power-on indication information is equal to a preset value, it indicates that the key-press information meets the function item triggering condition.

The technical solution of the present invention is described in further detail with reference to the embodiments as below.

Figure 4:
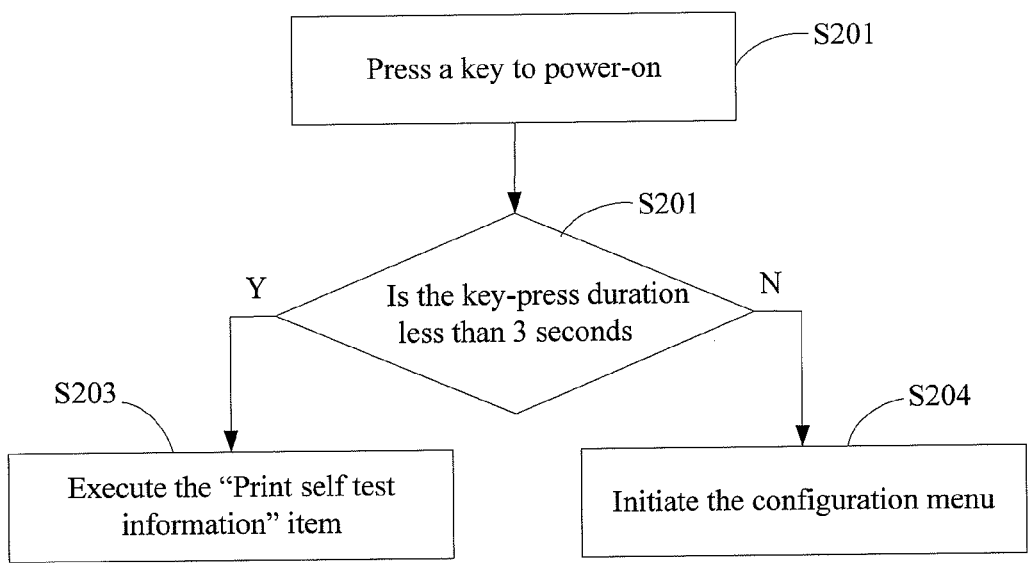
FIG. 4 is a flowchart of a printer control method according to a first embodiment of the present invention.

FIG. 4 is a flowchart of a printer control method according to a first embodiment of the present invention.

A "Print self test information" execution triggering condition and a configuration menu initiation triggering condition are set.

When a user operates a POS printer, usually he firstly prints self test information, through which the user can know a configuration information and a service state of hardware (e.g. print heads) of the printer.

The "Print self test information" triggering condition is set to: the key-press duration of the printer is equal to a preset time threshold (e.g. 3 seconds) if the printer is in a power-on state.

Figure 5:
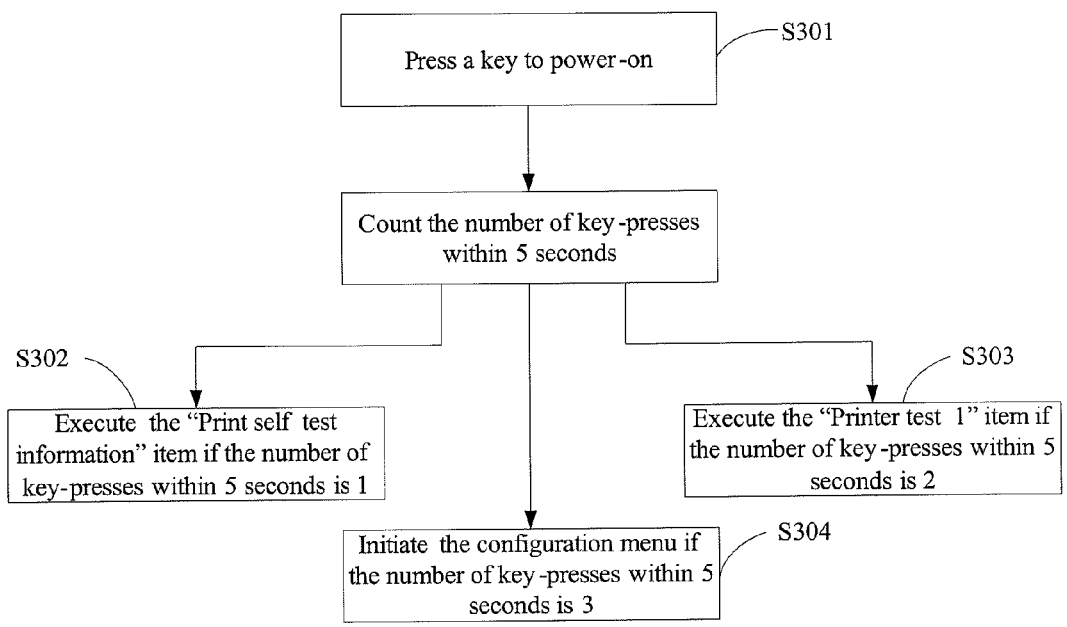
FIG. 5 is a flowchart of a printer control method according to a second embodiment of the present invention.

The configuration menu contains multiple function items and operation indication information of the function items. FIG. 5 illustrates the configuration menu, in which the user knows the operation methods of executing the function items (e.g. "Esc", "Printer test 1", "Printer test 2", or "Configure the printer") via the configuration menu, e.g. pressing the key once to execute the "Esc" item.

The configuration menu initiation triggering condition is set to: the key-press duration of the printer is less than the preset time threshold (e.g. 3 seconds) if the printer is in a power-on state.

The process goes to step S201 after the "Print self test information" execution triggering condition and the configuration menu initiation triggering condition are set.

In step S201, press a key to power-on.

For a printer with a single key, a switch controlling the printer is the power switch.

In step S202, it is determined whether the key-press duration is less than 3 seconds, and if so, the process goes to step S203, otherwise the process goes to step S204.

In step S203, the "Print self test information" item is executed.

In step S204, the configuration menu is initiated.

With the above detailed embodiment, the user can execute the "Print self test information" item directly by setting the triggering condition of the commonly used item ("Print self test information") through the specific key-press duration, which avoids the trouble that the user has to first print the configuration menu and then executes the "Print self test information" item according to indication information of the configuration menu if the user desires to know configuration information or the operation state of hardware of the printer via the self test information, thereby reducing operations and saving papers.

If there are multiple function items (e.g. "Print self test information" and "Printer test 1"), the user can control to execute a particular function item or to initiate the configuration menu according to the key-press duration. The key-press duration is difficult to control, thus the operability is not fine. The technical solution of another embodiment of the present invention is described in further detail.

FIG. 5 is a flowchart of a printer control method according to a second embodiment of the present invention.

Triggering conditions for "Print self test information" and "Printer test 1" items are respectively set to: the number of key-presses is 1 and 2 respectively within a preset period of time (5 seconds).

The "Printer test 1" item is primarily adapted to print test information, through which the user can know whether a position of print content on a print paper is appropriate, etc.

The configuration menu initiation triggering condition is: the number of key-presses is 3 within a preset period of time (5 seconds).

The process goes to step S301 after the "Print self test information" triggering condition and the configuration menu initiation triggering condition are set.

In step S301, press a key to power-on.

In step S302, the number of key-presses within 5 seconds is counted.

In step S303, the "Print self test information" item is executed if the number of key-presses is 1.

In step S304, the "Printer test 1" item is executed if the number of key-presses is 2.

In step S305, the configuration menu is initiated if the number of key-presses is 3.

With this embodiment, the number of key-presses within the preset period of time (e.g. 5 seconds) corresponds to different operations. The number of key-presses is easy to control and the operability is good.

Figure 6:
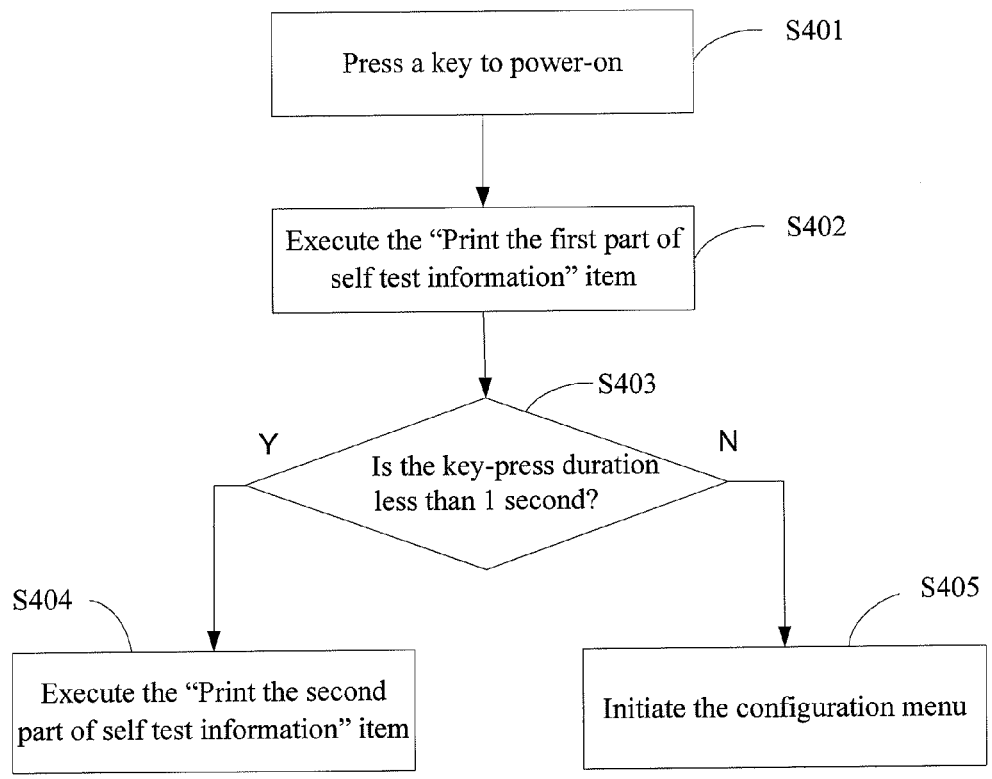
FIG. 6 is a flowchart of a printer control method according to a third embodiment of the present invention.

FIG. 6 is a flowchart of a printer control method according to a third embodiment of the present invention.

Figures 8, 9:
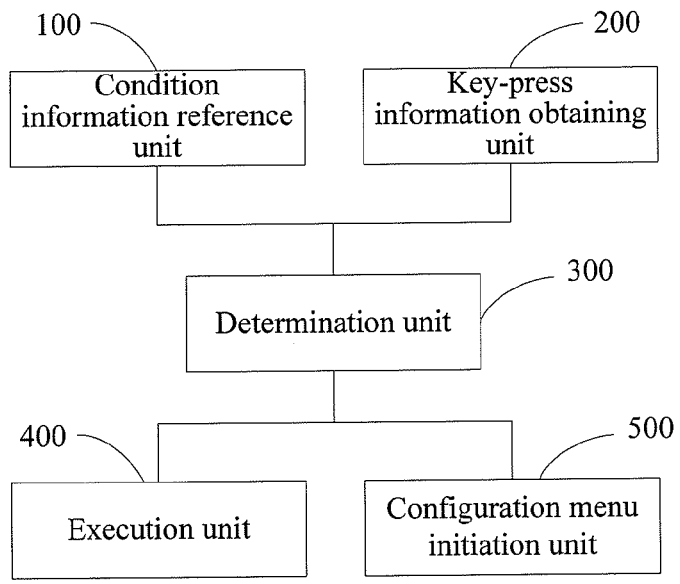
FIG. 8 is a schematic diagram of a second part of self test information.
FIG. 9 is a structural block diagram of a printer control device according to the present invention.

According to users' habits, the self test information may be classified into a first part and a second part. The first part of self test information is printer configuration information. FIG. 7 is a schematic diagram of a first part of self test information (configuration information). The user can know such information as version, interfacing mode, baud rate, data buffer space size of the printer according to the configuration information, and decides whether to configure the printer with parameters. The second part of self test information is character cyclic information adapted to indicate whether the printer heads fail to work and whether the ink density is appropriate. FIG. 8 is a schematic diagram of the second part of self test information (the character cyclic information).

A "Print the first part of self test information" item execution triggering condition is pre-set to: the value of the power-on indication information is 1 (which indicates that the state of the printer converts from power-off to power-on). A "Print the second part of self test information" execution triggering condition is pre-set to: if the printer is in a power-on state, the key-press duration within the preset period of time is less than 1 second.

A configuration menu initiation triggering condition is pre-set to: if the printer is in a power-on state, the key-press duration is more than 1 second.

The process goes to step S401 after the triggering conditions of executing the "Print the first part of self test information" and the "Print the second part of self test information" items and the configuration menu initiation triggering condition are set.

In step S401, press a key to power-on.

In step S402, the "Print the first part of self test information" item is executed.

Because the state of the printer converts from power-off to power-on, the power-on indication information indicates as "1".

In step S403, the process goes to step S404 if the key-press duration is less than 1, and goes to step S405 otherwise.

In step S404, the "Print the second part of self test information" item is executed.

In step S405, the configuration menu is initiated.

If the user only desires to know the configuration information of the printer, the technical solution of the above embodiment can avoid printing the second part of self test information, thereby avoiding the waste of papers and ink.

FIG. 9 is a structural block diagram of a printer control device according to the present invention.

The printer control device includes: a condition information reference unit 100, a key-press information obtaining unit 200, a determination unit 300, an execution unit 400 and a configuration menu initiation unit 500. The condition information reference unit 100 is adapted to store condition reference information which is set by a user (the condition reference information includes: function item execution triggering conditions and a configuration menu initiation triggering condition). The key-press information obtaining unit 200 is adapted to obtain key-press information from the user. The determination unit 300 is adapted to compare the key-press information and the condition reference information, and determine whether the key-press information meets a function item execution triggering condition or the configuration menu initiation triggering condition according to a comparison result. The execution unit 400 is adapted to execute a function item if the determination unit determines the key-press information meets a function item execution triggering condition. The configuration menu initiation unit 500 is adapted to initiate a configuration menu if the determination unit determines the key-press information meets the configuration menu initiation triggering condition.

The operating principal of the control device is as follows. The condition information reference unit 100 stores the condition reference information which is set by a user. The key-press information obtaining unit 200 obtains the key-press information. The determination unit 300 compares the condition reference information provided by the condition information reference unit 100 and the key-press information provide by the key-press information obtaining unit 200, and determines whether the key-press information matches the condition reference information (the function item execution triggering conditions and the configuration menu initiation triggering condition) according to the comparison result, sends an execution instruction message if the key-press information matches a function item execution triggering condition, and sends an initiation instruction message if the key-press information matches the configuration menu initiation triggering condition. The execution unit 400 executes the function item on receiving the execution instruction message. The configuration menu initiation unit 500 initiates the configuration menu on receiving the initiation instruction message.

The configuration menu includes multiple function items and methods for executing the function items. Execution triggering conditions of commonly used function items such as "Print self test information" and "Print test page" are set in the configuration menu. Also, the configuration menu initiation triggering condition is set, so that the users can select to directly perform the function items or to initiate the configuration menu.

The function item execution triggering conditions and the configuration menu initiation triggering condition may be preset according to the number of key-presses or a key-press duration threshold.

The key-press information may include: the number of key-presses within a preset period of time, the key-press duration, or power-on indication information for indicating a conversion from a power-off state to a power-on state of the printer.

The function items may be items commonly used by users, e.g. "Print self test information", "Printer test 1" and "Configure the printer".

For example:

If the function item is "Print self test information", the condition information reference unit 100 stores a "Print self test information" item execution triggering condition that is set by the user, the key-press duration is less than 3 seconds, and the configuration menu initiation triggering condition, the key-press duration is equal to or more than 3 seconds.

In the case that the printer is in a power-on state, if the key-press information obtaining unit 200 obtains the key-press information that the key-press duration is less than 3 seconds, it indicates that the key-press duration meets the "Print self test information" execution triggering condition, the execution unit 400 executes the "Print self test information" item; if the key-press information obtaining unit 200 obtains the key-press information that the key-press duration is equal to or more than 3 seconds, the configuration menu initiation unit 500 initiates the configuration menu.

If there are multiple function items (e.g. "Print self test information" and "Printer test 1"), the user can control to execute a particular function item or to initiate the configuration menu according to the key-press duration. The key-press duration is difficult to control, thus the operability is not fine.

For the user's convenience in the case of multiple function items (e.g. "Print self test information" and "Printer test 1"), the "Print self test information" item execution triggering condition may be set to: the number of key-presses is 1 within 5 seconds; the "Printer test 1" item execution triggering condition may be set to: the number of key-presses is 2 within 5 seconds; and the configuration menu initiation triggering condition may be set to: the number of key-presses is 3 within 5 seconds.

In the case that the printer is in a power-on state, if the key-press information obtaining unit 200 obtains the key-press information that the number of key-presses is 1 within 5 seconds, the determination unit 300 determines that the number of key-presses meets the "Print self test information" item execution triggering condition, and the execution unit 400 executes the "Print self test information" item; if the key-press information obtaining unit 200 obtains the key-press information that the number of key-presses is 2 within 5 seconds, the determination unit 300 determines that the number of key-presses meets the "Printer test 1" item execution triggering condition, and the execution unit 400 executes the "Printer test 1" item; if the key-press information obtaining unit 200 obtains the key-press information that the number of key-presses is 3 within 5 seconds, the determination unit 300 determines that the number of key-presses meets the configuration menu initiation triggering condition, and the configuration menu initiation unit 500 initiates the configuration menu.

According to users' habits, the self test information may be classified into a first part and a second part. The first part of self test information is printer configuration information, as illustrated in FIG. 7. The user can know such information as version, interfacing mode, baud rate, data buffer space size of the printer according to the configuration information, and decides whether to configure the printer with parameters. The second part of self test information is character cyclic information adapted to indicate whether the printer heads fail to work and whether the ink density is appropriate, as illustrated in FIG. 8.

A "Print the first part of self test information" item execution triggering condition is pre-set to: the key-press duration is more than 4 seconds and the value of the power-on indication information is 1 (which indicates that the state of the printer converts from power-off to power-on). A "Print the second part of self test information" item execution triggering condition is pre-set to: if the printer is in a power-on state, the key-press duration is less than 1 second.

A configuration menu initiation triggering condition is pre-set to: if the printer is in a power-on state, the key-press duration is more than 1 second.

The condition information reference unit 200 stores the "Print the first part of self test information" item execution triggering condition and the "Print the second part of self test information" item execution triggering condition. If the key-press information obtaining unit 200 obtains the key-press information that the key-press duration is more than 4 seconds, the determination unit 300 determines that the state of the printer converts from power-off to power-on and sends an execution instruction message, the execution unit 400 executes the "Print the first part of self test information" item on receiving the execution instruction message. If the printer is in a power-on state and the key-press information obtaining unit 200 obtains the key-press information that the key-press duration is less than 1 second, the determination unit 300 determines that the key-press duration meets the "Print the second part of self test information" item execution triggering condition and sends an execution instruction message, the execution unit 400 executes the "Print the second part of self test information" item on receiving the execution instruction message. If the printer is in a power-on state and the key-press information obtaining unit 200 obtains the key-press information that the key-press duration is more than 1 second, the determination unit 300 determines that the key-press duration meets the configuration item initiation triggering condition and sends an initiation instruction message, the configuration menu initiation unit 500 initiates the configuration menu on receiving the initiation instruction message.

Figure 10:
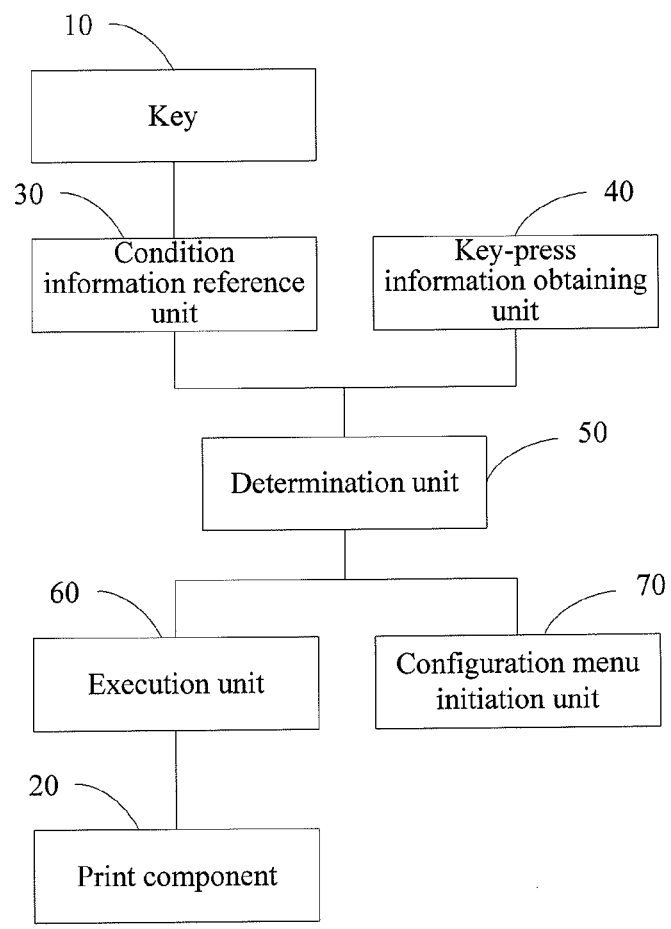
FIG. 10 is a structural diagram of a printer according to the present invention.

FIG. 10 is a structural diagram of a printer according to the present invention.

The printer includes an input key 10 and a print component 20 adapted to print information. The printer further includes: a condition information reference unit 30, a key-press information obtaining unit 40, a determination unit 50, an execution unit 60 and a configuration menu initiation unit 70.

The condition information reference unit 30 is adapted to store condition reference information (the condition reference information includes: function item execution triggering conditions and a configuration menu initiation triggering condition) which is set by a user. The key-press information obtaining unit 40 is adapted to obtain key-press information from the user and deliver the key-press information to the determination unit 50. The determination unit 300 is adapted to compare the key-press information and the condition reference information, and determine whether the key-press information meets a triggering condition according to a comparison result, sends an execution instruction message for executing a function item if the key-press information meets a function item execution triggering condition, and sends an initiation instruction message for initiating a configuration menu if the key-press information meets the configuration menu initiation triggering condition. The execution unit 60 is adapted to execute a function item on receiving the execution instruction message. The configuration menu initiation unit 70 is adapted to initiate a configuration menu on receiving the initiation instruction message.

The configuration menu includes multiple function items and methods for executing the function items. Execution triggering conditions of commonly used function items such as "Print self test information" and "Printer test" are set in the configuration menu. Also, the configuration menu initiation triggering condition is set, so that the users can select to directly perform the function items or to initiate the configuration menu.

The function item execution triggering conditions and the configuration menu initiation triggering condition may be pre-set according to according to the number of key-presses or a key-press duration threshold.

The key-press information may include: the number of key-presses within a preset period of time, a key-press duration, or power-on indication information for indicating a conversion from a power-off state to a power-on state of the printer.

The function items may be items commonly used by users, e.g. "Print self test information", "Printer test 1" and "Configure the printer".

For example:

If the function item is the "Print self test information", the condition information reference unit 30 stores a "Print self test information" item execution triggering condition that is set by the user, the key-press duration is less than 3 seconds, and the configuration menu initiation triggering condition, the key-press duration is equal to or more than 3 seconds.

In the case that the printer is in a power-on state, if the key-press information obtaining unit 40 obtains the key-press information that the key-press duration is less than 3 seconds, it indicates that the key-press duration meets the "Print self test information" execution triggering condition, and the execution unit 400 executes the "Print self test information" item; if the key-press information obtaining unit 40 obtains the key-press information that the key-press duration is equal to or more than 3 seconds, the configuration menu initiation unit 70 initiates the configuration menu.

If there are multiple function items (e.g. "Print self test information" and "Printer test 1"), the user can control to execute a particular function item or to initiate the configuration menu according to the key-press duration. The key-press duration is difficult to control, thus the operability is not fine.

For the user's convenience in the case of multiple function items (e.g. "Print self test information" and "Printer test 1"), the "Print self test information" item execution triggering condition may be set to: the number of key-presses is 1 within 5 seconds; the "Printer test 1" item execution triggering condition may be set to: the number of key-presses is 2 within 5 seconds; and the configuration menu initiation triggering condition may be set to: the number of key-presses is 3 within 5 seconds.

In the case that the printer is in a power-on state, if the key-press information obtaining unit 40 obtains the key-press information that the number of key-presses is 1 within 5 seconds, the determination unit 50 determines that the number of key-presses meets the "Print self test information" item execution triggering condition and sends a first execution instruction message, and the execution unit 60 executes the "Print self test information" item on receiving the first execution instruction message; if the key-press information obtaining unit 40 obtains the key-press information that the number of key-presses is 2 within 5 seconds, the determination unit 50 determines that the number of key-presses meets the "Printer test 1" item execution triggering condition and sends a second execution instruction message, and the execution unit 60 executes the "Printer test 1" item on receiving the second execution instruction message; if the key-press information obtaining unit 40 obtains the key-press information that the number of key-presses is 3 within 5 seconds, the determination unit 50 determines that the number of key-presses meets the configuration menu initiation triggering condition and sends an initiation instruction message, and the configuration menu initiation unit 70 initiates the configuration menu on receiving the initiation instruction message.

According to users' habits, the self test information may be classified into a first part and a second part. The first part of self test information is printer configuration information, as illustrated in FIG. 7. The user can know such information as version, interfacing mode, baud rate, data buffer space size of the printer according to the configuration information, and decides whether to configure the printer with parameters. The second part of self test information is character cyclic information adapted to indicate whether the printer heads fail to work and whether the ink density is appropriate, as illustrated in FIG. 8.

A "Print the first part of self test information" item execution triggering condition is pre-set to: the key-press duration is more than 4 seconds and the value of the power-on indication information is 1 (which indicates that the state of the printer converts from power-off to power-on). A "Print the second part of self test information" item execution triggering condition is pre-set to: if the printer is in a power-on state, the key-press duration is less than 1 second.

A configuration menu initiation triggering condition is pre-set to: if the printer is in a power-on state, the key-press duration is more than 1 second.

The condition information reference unit 30 stores the "Print the first part of self test information" triggering condition and the "Print the second part of self test information" triggering condition. If the key-press information obtaining unit 40 obtains the key-press information that the key-press duration is more than 4 seconds, the determination unit 50 determines that the state of the printer converts from power-off to power-on and sends a first execution instruction message, the execution unit 60 executes the "Print the first part of self test information" item on receiving the first execution instruction message. If the printer is in a power-on state and the key-press information obtaining unit 40 obtains the key-press information that the key-press duration is less than 1 second, the determination unit 50 determines that the key-press duration meets the "Print the second part of self test information" item execution triggering condition and sends a second execution instruction message, the execution unit 60 executes the "Print the second part of self test information" on receiving the second execution instruction message. If the printer is in a power-on state and the key-press information obtaining unit 40 obtains the key-press information that the key-press duration is more than 1 second, the determination unit 50 determines that the key-press duration meets the configuration item initiation triggering condition and sends an initiation instruction message, the configuration menu initiation unit 70 initiates the configuration menu on receiving the initiation instruction message.

In this embodiment, commonly used function item execution triggering conditions and a configuration menu initiation triggering condition are set, through which it is determined whether the key-press information meets the function item execution triggering conditions or the configuration menu initiation triggering condition. If the key-press information meets a function item execution triggering condition, a function item is executed directly, which can reduce direct initiation of the configuration menu and bring simple operations. For those users who do not need to menu match but desire to directly execute a particular function item, it does not need to print a configuration menu, thereby saving papers.

The above description is merely preferred embodiments of the present invention, which does not limit the scope of the present invention. Any variations that can be conceived by those skilled in the art, any modifications made within the disclosure of the present invention shall fall into the scope of the present invention.

What is claimed is:

1. A printer control method, comprising:
   setting a function item execution triggering condition and a configuration menu initiation triggering condition, wherein the function item is print self test information or printer configuration;
   executing the function item if key-press information meets the function item execution triggering condition; and initiating a configuration menu if key-press information meets the configuration menu initiation triggering condition; and
   wherein if the function item is Print the first part of self test information, the execution triggering condition is: the state of the printer converts from power-off to power-on; if the function item is Print the second part of self test information, the execution triggering condition is: the key-press information is that the key-press duration is equal to the preset time threshold; the configuration menu initiation triggering condition is: the key-press information is that the key-press duration is not equal to the preset time threshold.

2. The printer control method according to claim 1, wherein the function item execution triggering condition comprises: the state of the printer converts from power-off to power-on.

3. The printer control method according to claim 1, wherein the function item execution triggering condition or the configuration menu initiation triggering condition comprises: if the printer is in a power-on state, the number of key-presses within a preset period of time is more than or equal to a preset number of key-presses.

4. The printer control method according to claim 1, wherein the function item execution triggering condition or the configuration menu initiation triggering condition comprises: if the printer is in a power-on state, a key-press duration is more than a preset time threshold.

5. The printer control method according to claim 1, wherein the key-press information is: the number of key-presses within a preset period of time, a key-press duration, or power-on indication information for indicating a conversion from a power-off state to a power-on state of the printer.

6. A printer control device, comprising:
   a condition information reference unit, a key-press information obtaining unit, a determination unit, an execution unit and a configuration menu initiation unit; wherein
   the condition information reference unit is adapted to store condition reference information which is set by a user, the condition reference information comprising a function item execution triggering condition and a configuration menu initiation triggering condition, wherein the function item is print self test information or printer configuration;
   the key-press information obtaining unit is adapted to obtain key-press information and deliver the key-press information to the determination unit;
   the determination unit is adapted to compare the key-press information and the condition reference information, and determine whether the key-press information meets a triggering condition according to a comparison result, sends an execution instruction message for executing a function item if the key-press information meets the function item execution triggering condition, and sends an initiation instruction message for initiating a configuration menu if the key-press information meets the configuration menu initiation triggering condition;
   the execution unit is adapted to execute the function item on receiving the execution instruction message;
   the configuration menu initiation unit is adapted to initiate the configuration menu on receiving the initiation instruction message; and
   wherein if the function item is Print the first part of self test information, the execution triggering condition is: the state of the printer converts from power-off to power-on; if the function item is Print the second part of self test information, the execution triggering condition is: the key-press information is that the key-press duration is equal to the preset time threshold; the configuration menu initiation triggering condition is: the key-press information is that the key-press duration is not equal to the preset time threshold.

7. The printer control device according to claim 6, wherein the key-press information is:

indication information for indicating a conversion from a power-off state to a power-on state the number of key-presses within a preset period of time, a key-press duration, or power-on of the printer.

8. A printer, comprising an input key and a print component adapted to print information, wherein the printer further comprises:

a condition information reference unit, a key-press information obtaining unit, a determination unit, an execution unit and a configuration menu initiation unit;

wherein the condition information reference unit is adapted to store condition reference information which is set by a user, the condition reference information comprising a function item execution triggering condition and a configuration menu initiation triggering condition, wherein the function item is print self test information or printer configuration;

the key-press information obtaining unit is connected with the input key and adapted to obtain key-press information and deliver the key-press information to the determination unit;

the determination unit is adapted to compare the key-press information and the condition reference information, and determine whether the key-press information meets a triggering condition according to a comparison result, sends an execution instruction message for executing the function item if the key-press information meets the function item execution triggering condition, and sends an initiation instruction message for initiating a configuration menu if the key-press information meets the configuration menu initiation triggering condition;

the execution unit is adapted to send the function item to the print component on receiving the execution instruction message;

the configuration menu initiation unit is adapted to initiate the configuration menu on receiving the initiation instruction message; and wherein if the function item is Print the first part of self test information, the execution triggering condition is: the state of the printer converts from power-off to power-on; if the function item is Print the second part of self test information, the execution triggering condition is: the key-press information is that the key-press duration is equal to the preset time threshold; the configuration menu initiation triggering condition is: the key-press information is that the key-press duration is not equal to the preset time threshold.

9. The printer according to claim 8, wherein the key-press information is:

the number of key-presses within a preset period of time, a key-press duration, or power-on indication information for indicating a conversion from a power-off state to a power-on state of the printer.

* * * * *